June 30, 1931.  F. C. FANTZ  1,812,523
PROCESS OF MANUFACTURING METAL PIPE FITTINGS WITH TANGENTIAL ENDS
Filed April 18, 1931  2 Sheets-Sheet 2

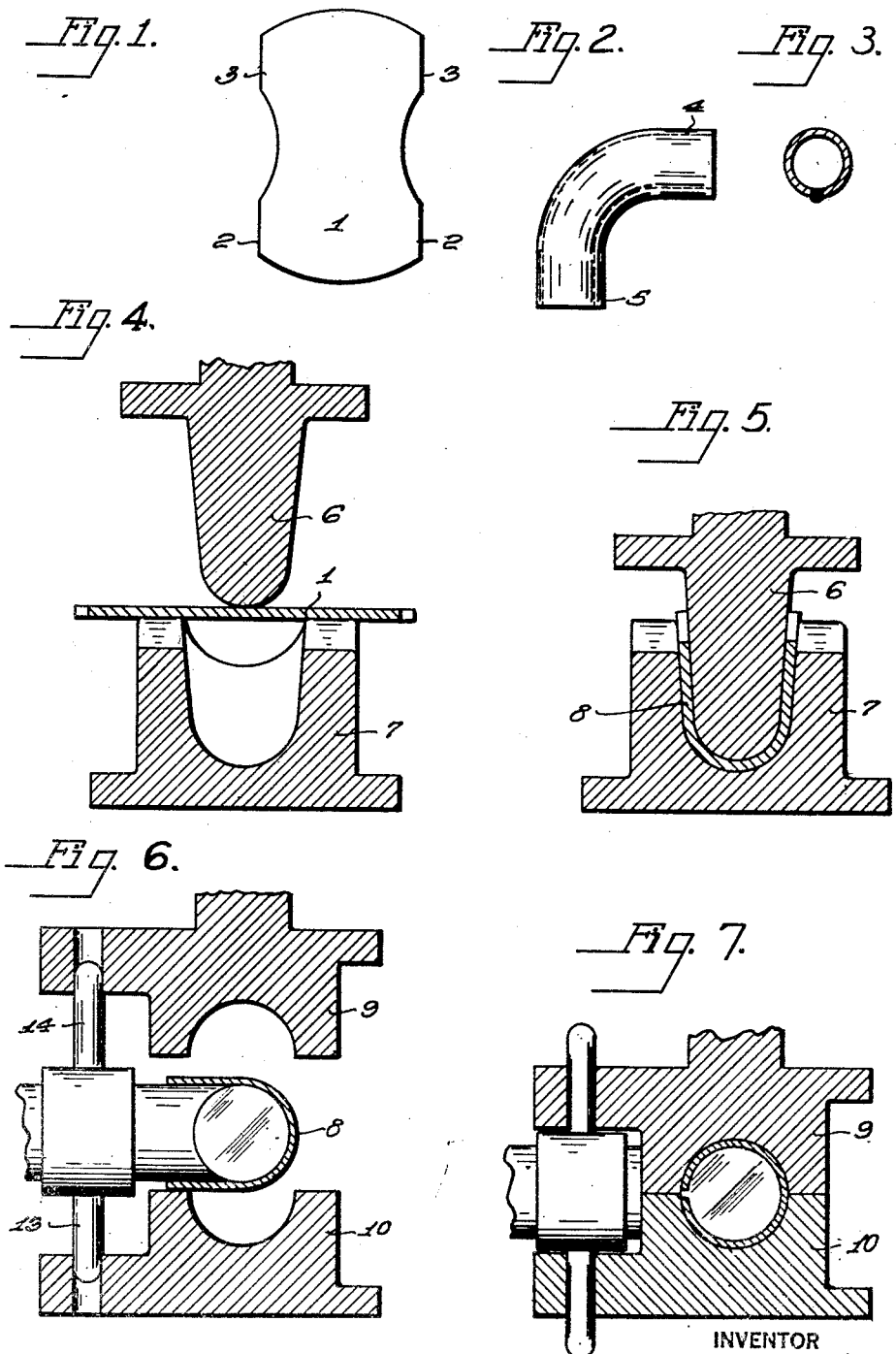

INVENTOR
Fred C. Fantz
BY
Harry Lea Dodson
ATTORNEY

Patented June 30, 1931

1,812,523

UNITED STATES PATENT OFFICE

FRED C. FANTZ, OF WEBSTER GROVES, MISSOURI, ASSIGNOR TO MIDWEST PIPING & SUPPLY CO. INC., OF ST. LOUIS, MISSOURI, A CORPORATION OF MISSOURI

PROCESS OF MANUFACTURING METAL PIPE FITTINGS WITH TANGENTIAL ENDS

Application filed April 18, 1931. Serial No. 531,220.

My invention relates to a process of manufacturing metal pipe fittings such as elbows, T's, reducers, etc., where it is desirable to have a free and unobstructed passage for the flow of fluid through the pipe and fitting and where there shall be no inherent weakness in the walls of the fitting due to the thinning of the metal caused during its manufacture.

It is exceedingly difficult to form curved fittings of this kind which are not on a true radius due to the difficulty in removing the mandrel and this forces the use of sectional mandrels with the well known difficulties and added expense accompanying their use. As a consequent when the fitting has been so formed and it is desired to form a tangent for either or both ends, the fitting is heated and a straight mandrel is driven into the end of the fittings. This stretches the metal and produces attendant weakness in the walls of the fitting.

My invention has for its principal object to provide a method which, if followed, will construct a fitting having any desired tangent for either or both ends without in any degree stretching or weakening the fitting.

A further object is to provide a process which will enable the production of a fitting which will be of uniform sectional area throughout and which will have the metal forming its walls actually more dense than the material in the blank which is used from which to form the fitting.

A further object is to provide a method which, when followed, will produce a finished fitting of substantially exact contour.

A further object is to provide a method by which it is possible to construct a fitting having no inherent weakness due to a thinning of the metal in some places caused by its manufacture.

A further object is to provide a method which will accomplish the foregoing objects but in a very inexpensive manner and will produce a fitting at a substantial reduction in cost of both labor and material.

My means of attaining the foregoing objects may be more readily understood by having reference to the accompanying drawings which are hereunto annexed and are a part of this specification and which are more or less diagrammatic in form since it will be obvious to persons skilled in the art that once being placed in possession of the steps of the process invented by me, the apparatus employed can be widely varied.

Fig. 1 is a plan view of a blank used in my process;

Fig. 2 shows a finished fitting;

Fig. 3 is a cross section of the fitting shown in Fig. 2;

Fig. 4 shows the dies and blank for the first operation, the dies being in open position;

Fig. 5 is the same, the dies being closed;

Fig. 6 is a cross section of the dies as used in the second operation, the dies being in open position showing the fitting with a mandrel in the fitting.

Fig. 7 is a similar view with the dies closed;

Similar reference numerals refer to similar parts throughout the entire description.

Figure 8:
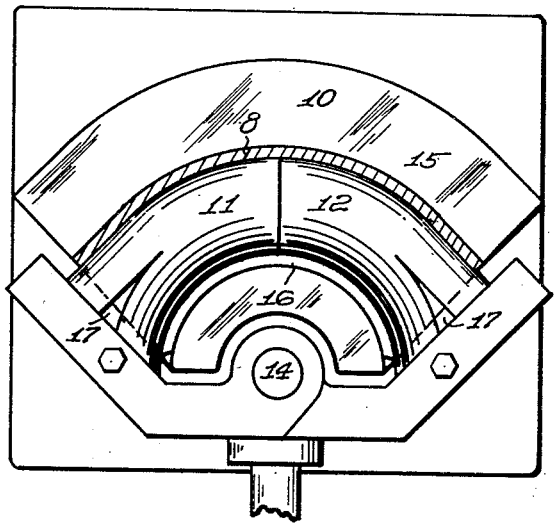
Fig. 8 is a plan view of the lower die of a pair of dies as shown in cross section, Figs. 6 and 7, used in closing the radius section and partially closing the tangential ends of the fitting, the fitting being shown in section and the mandrel in place.

Before setting out the various steps of my method, which employs a series of dies, I wish it to be understood that I am not limiting myself to the specific details of apparatus shown and described since they are not essential to the practice of my method.

Many forms will readily suggest themselves to skilled workmen in this art after they have been made acquainted with my method. The drawings also are furnished solely for illustrative purposes to disclose a concrete embodiment of structural means to carry out the various steps involved in the practice of my method.

In the drawings are shown the dies used to perform the various operations to carry out my method. I first form the blank 1 shown in Fig. 1, the sides 2 and 3 being cut for whatever length is desired for the tangential ends 4 and 5 of the finished fitting shown in Fig. 2. The blank 1, which has an excess of metal either in thickness or area beyond what would be required to form the desired fittings, is then placed in a pair of dies 6 and 7, as shown in Fig. 4. These dies are then closed as in Fig. 5, forming the blank 1 into a form 8, which is U-shaped in cross section. The central portion of this U-shaped form 8 is formed on a true radius, the ends being tangential to the arc thus formed.

The U-shaped form 8 is then placed in a pair of dies 9 and 10. A mandrel, more clearly seen in Fig. 8 which shows the lower die 11 in plan, the U-shaped piece 8 being shown in section, is then moved into the U-shaped piece 8. The mandrel is formed in two parts 11 and 12 which swing on pivots 13 and 14 which also act as guides for the dies 9 and 10. The outside 15 of the mandrel is formed with a tangent at each end of an arc, while its inside 16 is on a true radius. This forms a flat side 17 on each end of the mandrel.

Figure 9:
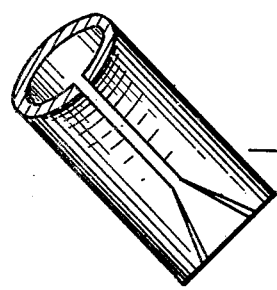
Fig. 9 is a view of a fragmentary portion of the fitting after the operation in Figs. 6, 7, and 8.
Figure 10:
Fig. 10 is an end view of the partially formed tangent on the fitting after the operation of the dies in Figs. 6, 7, and 8.
Figure 11:
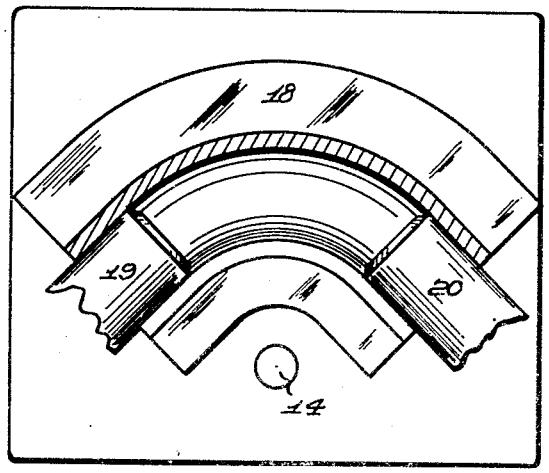
Fig. 11 is a plan view of the lower die of a pair of dies used in closing or forming the tangent parts of the fitting preparatory to welding.
Figure 12:
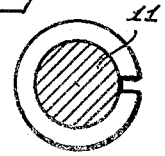
Fig. 12 is an end view of the tangent portion of the fitting and the mandrel, after the operation in the dies of Fig. 11, the mandrel being sectioned.

The dies 9 and 10 are then closed and this closes that portion of the U-shaped member 6 which is formed on the radius only, but may partially close the tangents, leaving them as more clearly shown in Fig. 9. The mandrel is then withdrawn by pivoting the two halves 11 and 12 around pivots 13 and 14, and two stub or plug mandrels 19 and 20, of circular cross section, are inserted in the tangents and the dies are then closed forming the tangents as seen in Fig. 12. It should be borne in mind that that portion of the fitting formed on a radius has already been so closed by the dies 9 and 10.

The fitting is now ready for welding. After it has been welded it is preferably reheated and placed in a pair of finishing dies, (not shown), of the exact contour and diameter desired, and compressed. This serves to compress the surplus or excess metal and in this manner makes it more dense than the plate from which the blank was formed.

In some cases it may be found desirable to omit the plug mandrels 19 and 20 since it is possible to close the tangents without the use of mandrels if the arcuate portion has been formed as described.

It will also be seen that any desired length of tangent can be formed because of their not being fully closed by the dies 9 and 10, hence the arcuate mandrel can always be withdrawn without difficulty. Also for some fittings I may dispense with the last operation letting the dies 10 and 11 size the fitting. By this method I can produce a fitting having substantially uniform cross sectional area and free from any inherent weakness resulting from the thinning of the metal by it stretching during the operations.

Having described my invention what I regard as new and desire to secure by Letters Patent is:

1. The process of forming pipe fittings which consists in providing a suitable blank of metal having an excess above that desired for the walls of the finished fitting, bending the blank into an arcuate form U-shaped in cross section, having tangential portions at each end, inserting a mandrel formed in halves and having its outside arcuate in its center portion but which terminates in tangents, its inner side being formed on a true radius, the sides of the outer ends of said mandrel being substantially flat, closing said dies, thereby pressing the sides of the U dies towards each other over the arcuate portion until their edges abut forming a circle, and the tangential portion into an oval, removing said mandrel, compressing said fitting in a pair of dies until it is circular in cross section throughout its length, and welding the adjoining edges of said fitting.

2. The process of forming pipe fitting which consists in providing a suitable blank of metal having an excess above that desired for the walls of the finished fitting, bending the blank into an arcuate form U-shaped in cross section, having tangential portions at each end, inserting a mandrel formed in halves and having its outside arcuate in its center portion but which terminates in tangents, its inner sides being formed on a true radius, the sides of the outer ends of said mandrel being substantially flat, closing said dies, thereby pressing the sides of the U towards each other over the arcuate portion until their edges abut forming a circle, and the tangential portion into an oval, removing said mandrel, compressing said fitting in a pair of dies over a pair of stub mandrels in said augmented portions until it is circular in cross section throughout its length, and welding the adjoining edges of said fitting.

3. The process of forming pipe fittings which consists in providing a suitable blank of metal having an excess above that desired for the walls of the finished fitting, bending the blank into an arcuate form U-shaped in cross section, having tangential portions at each end, inserting a mandrel formed in halves and having its outside arcuate in its center portion but which terminates in tangents, its inner side being formed on a true radius, the sides of the outer ends of said mandrel being substantially flat, closing said dies, thereby pressing the sides of the U towards each other over the arcuate portion into an oval, removing said mandrel, compressing said fitting in a pair of dies until it is circular in cross section throughout its length, welding the adjoining edges of said fitting, reheating said fitting, and compressing the same between dies of the exact size and shape required.

4. The process of forming pipe fittings which consists in providing a suitable blank of metal having an excess above that desired for the walls of the finished fitting, bending the blank into a form U-shaped in cross section, compressing the sides of said U-shape, adjacent the center until their edges abut, bending the ends into an oval tangential to said central portion, compressing the entire fitting until it is circular in cross section, and welding the edges.

5. The process of forming pipe fittings which consists in providing a suitable blank of metal having an excess above that desired for the walls of the finished fitting, bending the blank into a form U-shaped in cross section, compressing the sides of said U-shape, adjacent the center until their edges abut, bending the ends into an oval tangential to said central portion, compressing the entire fitting until it is circular in cross section, welding the edges, reheating said fitting, and compressing same between dies of the size required.

6. The process of forming pipe fittings which consists in providing a suitable blank of metal having an excess above that desired for the walls of the finished fitting, bending the blank into a form U-shaped in cross section, compressing the sides of said U-shape, adjacent the center until their edges abut, bending the ends into an oval tangential to said central portion, compressing the entire fitting until it is circular in cross section, welding the edges, and compressing said fitting between dies of the size required.

7. The process of forming pipe fittings which consists in forming the central portion of a suitable blank into an arcuate form circular in cross section, with abutting edges, forming oval tangential portions at each side of said arcuate portion, compressing the fitting thus formed into a true circular formation in cross section.

8. The process of forming pipe fittings which consists in forming the central portion of a suitable blank into an arcuate form circular in cross section, with abutting edges, forming oval tangential portions at each side of said arcuate portion, compressing the fitting thus formed into a true circular formation in cross section, welding said abutting edges, reheating said fittings, and compressing same between dies of the size required.

9. The process of forming pipe fittings which consists in forming the central portion of a suitable blank into an arcuate form circular in cross section, with abutting edges, forming oval tangential portions at each side of said arcute portion, compressing the fitting thus formed into a true circular formation in cross section, welding the abutting edges, and compressing same between dies of the size required.

FRED C. FANTZ.